(12) United States Patent
Wong et al.

(10) Patent No.: US 6,924,443 B2
(45) Date of Patent: Aug. 2, 2005

(54) REDUCING OXIDES ON A SWITCHING FLUID IN A FLUID-BASED SWITCH

(75) Inventors: Marvin Glenn Wong, Woodland Park, CO (US); John Ralph Lindsey, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 278 days.

(21) Appl. No.: 10/413,794

(22) Filed: Apr. 14, 2003

(65) Prior Publication Data

US 2005/0034962 A1 Feb. 17, 2005

(51) Int. Cl.[7] .............................................. H01H 29/00
(52) U.S. Cl. ....................................................... 200/182
(58) Field of Search ........................ 200/182, 187–189, 200/193, 194, 214–216, 233–236; 310/328, 331, 348, 363; 335/4, 47, 78; 385/19

(56) References Cited

U.S. PATENT DOCUMENTS

| 2,312,672 A | 3/1943 | Pollard, Jr. |
| 2,564,081 A | 8/1951 | Schilling |
| 3,430,020 A | 2/1969 | Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |

(Continued)

FOREIGN PATENT DOCUMENTS

| EP | 0593836 A1 | 4/1994 |
| FR | 2418539 | 9/1979 |
| FR | 2458138 | 12/1980 |
| FR | 2667396 | 4/1992 |
| JP | 36-18575 | 10/1961 |
| JP | 47-21645 | 10/1972 |
| JP | 62-276838 | 12/1987 |
| JP | 63-294317 | 12/1988 |
| JP | 8-125487 | 5/1996 |
| JP | 9-161640 | 6/1997 |
| WO | WO99-46624 | 9/1999 |

OTHER PUBLICATIONS

TDB–ACC–NO: NB8406827, "Integral Power Resistors For Aluminum Substrate", IBM Technical Disclosure Bulletin, Jun. 1984, US, vol. 27, Issue No. 1B, p. 827.

Bhedwar, Homi C., et al. "Ceramic Multilayer Package Fabrication", Electronic Materials Handbook, Nov. 1989, pp 460–469, vol. 1 Packaging, Section 4: Packages.

Kim, Joonwon, et al., "A Micromechanical Switch With Electrostatically Driven Liquid–Metal Droplet", Sensors And Actuators, A; Physical v 9798, Apr. 1, 2002, 4 pages.

Marvin Glenn Wong, U.S. Appl. No. 10/137,691 (pending), "A Piezoelectrically Actuated Liquid Metal Switch", May 2, 2002.

J. Simon, et al., "A Liquid–Filled Microrelay with a Moving Mercury Microdrop", Journal of Microelectromechanical Systems, vol. 6, No. 3, Sep. 1997, pp. 208–216.

Marvin Glenn Wong, et al., New U.S. Patent Application (11 pages specification, 6 pages of claims, 1 page abstract, and 6 sheets of drawings), "Reducing Oxides on a Switching Fluid in a Fluid–Based Switch", Filed Apr. 14, 2003.

*Primary Examiner*—Michael A. Friedhofer

(57) ABSTRACT

Fluid-based switch and methods for reducing oxides on switching fluid are disclosed. In one method, oxides are reduced by depositing a switching fluid on a first substrate, mating the first substrate to a second substrate, the first substrate and the second substrate defining therebetween a cavity holding the switching fluid, the cavity being sized to allow movement of the switching fluid between first and second states, and creating a gas in the cavity holding the switching fluid, the gas to react with at least one of oxygen in the cavity and oxides on the switching fluid.

30 Claims, 6 Drawing Sheets

U.S. PATENT DOCUMENTS

| | | | |
|---|---|---|---|
| 4,200,779 | A | 4/1980 | Zakurdaev et al. |
| 4,238,748 | A | 12/1980 | Goullin et al. |
| 4,245,886 | A | 1/1981 | Kolodzey et al. |
| 4,336,570 | A | 6/1982 | Brower |
| 4,419,650 | A | 12/1983 | John |
| 4,434,337 | A | 2/1984 | Becker |
| 4,475,033 | A | 10/1984 | Willemsen et al. |
| 4,505,539 | A | 3/1985 | Auracher et al. |
| 4,582,391 | A | 4/1986 | Legrand |
| 4,628,161 | A | 12/1986 | Thackrey |
| 4,652,710 | A | 3/1987 | Karnowsky et al. |
| 4,657,339 | A | 4/1987 | Fick |
| 4,742,263 | A | 5/1988 | Harnden, Jr., et al. |
| 4,786,130 | A | 11/1988 | Georgiou et al. |
| 4,797,519 | A | 1/1989 | Elenbaas |
| 4,804,932 | A | 2/1989 | Akanuma et al. |
| 4,988,157 | A | 1/1991 | Jackel et al. |
| 5,278,012 | A | 1/1994 | Yamanaka et al. |
| 5,415,026 | A | 5/1995 | Ford |
| 5,502,781 | A | 3/1996 | Li et al. |
| 5,644,676 | A | 7/1997 | Blomberg et al. |
| 5,675,310 | A | 10/1997 | Wojnarowski et al. |
| 5,677,823 | A | 10/1997 | Smith |
| 5,751,074 | A | 5/1998 | Prior et al. |
| 5,751,552 | A | 5/1998 | Scanlan et al. |
| 5,828,799 | A | 10/1998 | Donald |
| 5,841,686 | A | 11/1998 | Chu et al. |
| 5,849,623 | A | 12/1998 | Wojnarowski et al. |
| 5,874,770 | A | 2/1999 | Saia et al. |
| 5,875,531 | A | 3/1999 | Nellissen et al. |
| 5,886,407 | A | 3/1999 | Polese et al. |
| 5,889,325 | A | 3/1999 | Uchida et al. |
| 5,912,606 | A | 6/1999 | Nathanson et al. |
| 5,915,050 | A | 6/1999 | Russell et al. |
| 5,972,737 | A | 10/1999 | Polese et al. |
| 5,994,750 | A | 11/1999 | Yagi |
| 6,021,048 | A | 2/2000 | Smith |
| 6,180,873 | B1 | 1/2001 | Bitko |
| 6,201,682 | B1 | 3/2001 | Mooij et al. |
| 6,207,234 | B1 | 3/2001 | Jiang |
| 6,212,308 | B1 | 4/2001 | Donald |
| 6,225,133 | B1 | 5/2001 | Yamamichi et al. |
| 6,278,541 | B1 | 8/2001 | Baker |
| 6,304,450 | B1 | 10/2001 | Dibene, II et al. |
| 6,320,994 | B1 | 11/2001 | Donald et al. |
| 6,323,447 | B1 | 11/2001 | Kondoh et al. |
| 6,351,579 | B1 | 2/2002 | Early et al. |
| 6,356,679 | B1 | 3/2002 | Kapany |
| 6,373,356 | B1 | 4/2002 | Gutierrez et al. |
| 6,396,012 | B1 | 5/2002 | Bloomfield |
| 6,396,371 | B2 | 5/2002 | Streeter et al. |
| 6,408,112 | B1 | 6/2002 | Bartels |
| 6,446,317 | B1 | 9/2002 | Figueroa et al. |
| 6,453,086 | B1 | 9/2002 | Tarazona |
| 6,470,106 | B2 | 10/2002 | McClelland et al. |
| 6,487,333 | B2 | 11/2002 | Fouquet |
| 6,501,354 | B1 | 12/2002 | Gutierrez et al. |
| 6,512,322 | B1 | 1/2003 | Fong et al. |
| 6,515,404 | B1 | 2/2003 | Wong |
| 6,516,504 | B2 | 2/2003 | Schaper |
| 6,559,420 | B1 | 5/2003 | Zarev |
| 6,633,213 | B1 | 10/2003 | Dove |
| 6,781,074 | B1 * | 8/2004 | Fong et al. ................. 200/182 |
| 6,787,720 | B1 * | 9/2004 | Wong ........................ 200/182 |
| 6,806,431 | B2 * | 10/2004 | Kondoh et al. ............. 200/182 |
| 6,822,176 | B1 * | 11/2004 | Fazzio ....................... 200/182 |
| 6,831,532 | B2 * | 12/2004 | Fong et al. .................... 335/47 |
| 6,841,746 | B2 * | 1/2005 | Wong et al. ................ 200/182 |
| 6,855,898 | B2 * | 2/2005 | Wong et al. ................ 200/182 |
| 2002/0037128 | A1 | 3/2002 | Burger et al. |
| 2002/0146197 | A1 | 10/2002 | Yong |
| 2002/0150323 | A1 | 10/2002 | Nishida et al. |
| 2002/0168133 | A1 | 11/2002 | Saito |
| 2003/0035611 | A1 | 2/2003 | Shi |

* cited by examiner

REDUCING OXIDES ON A SWITCHING FLUID IN A FLUID-BASED SWITCH

BACKGROUND OF THE INVENTION

Liquid metal micro switches (LIMMS) have been made that use a liquid metal, such as mercury, as the switching fluid. The liquid metal may make and break electrical contacts. To change the state of the switch, a force is applied to the switching fluid, which causes it to change form and move. The liquid metal may form oxide films that inhibit proper functioning of the switch. For example, the oxide film may increase the surface tension of the liquid metal, which may increase the energy required for the switch to change state.

SUMMARY OF THE INVENTION

In one embodiment, a method for reducing oxides on switching fluid is disclosed. The method includes depositing a switching fluid on a first substrate. The first substrate is mated to a second substrate, the first substrate and the second substrate defining therebetween a cavity holding the switching fluid. The cavity is sized to allow movement of the switching fluid between first and second states. A gas to react with oxygen in the cavity or oxides on the switching fluid is created in the cavity holding the switching fluid.

In another embodiment, the method comprises depositing a switching fluid on a first substrate and mating the first substrate to a second so that a cavity holding the switching fluid is defined therebetween. The cavity is sized to allow movement of the switching fluid between first and second states. Gas that is to react with at least one of oxygen in the cavity and oxides on the switching fluid is injected into the cavity.

BRIEF DESCRIPTION OF THE DRAWINGS

Illustrative embodiments of the invention are illustrated in the drawings in which.

DETAILED DESCRIPTION

Figure 1:
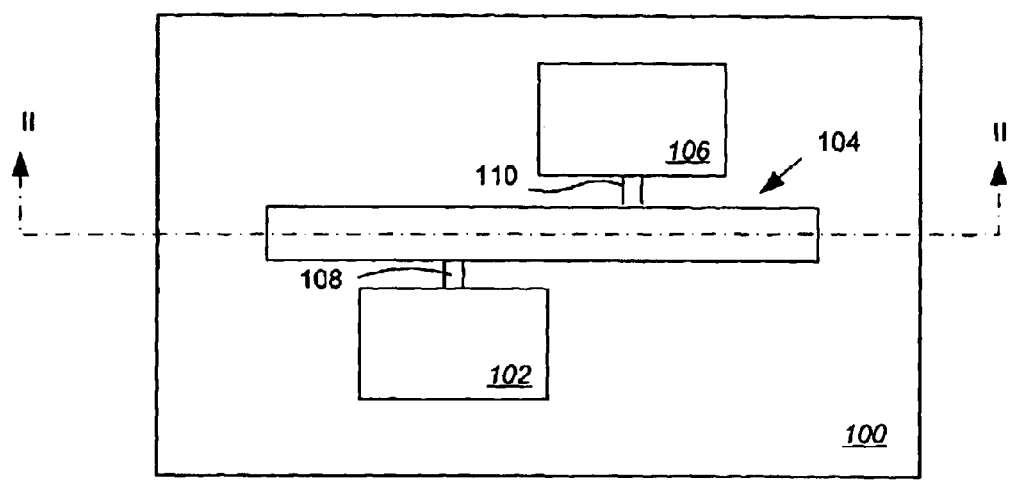
FIG. 1 illustrates a plan view of a first exemplary embodiment of a fluid-based switch.
Figure 2:
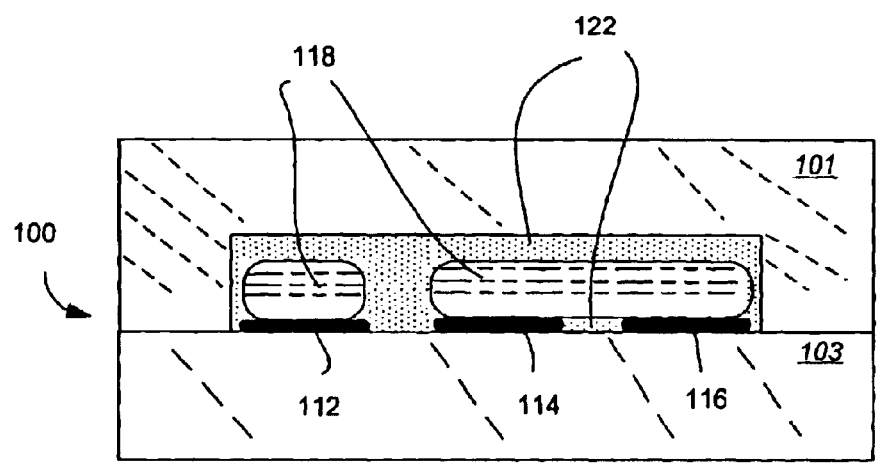
FIG. 2 illustrates an elevation of the switch shown in FIG. 1.

FIGS. 1 and 2 illustrate a fluid-based switch such as a LIMMS. The switch 100 includes a switching fluid cavity 104, a pair of actuating fluid cavities 102, 106, and a pair of cavities 108, 110 that connect corresponding ones of the actuating fluid cavities 102, 106 to the switching fluid cavity 104. It is envisioned that more or fewer channels may be formed in the switch. For example, the pair of actuating fluid cavities 102, 106 and pair of connecting cavities 108, 110 may be replaced by a single actuating fluid cavity and single connecting cavity.

Figure 3:
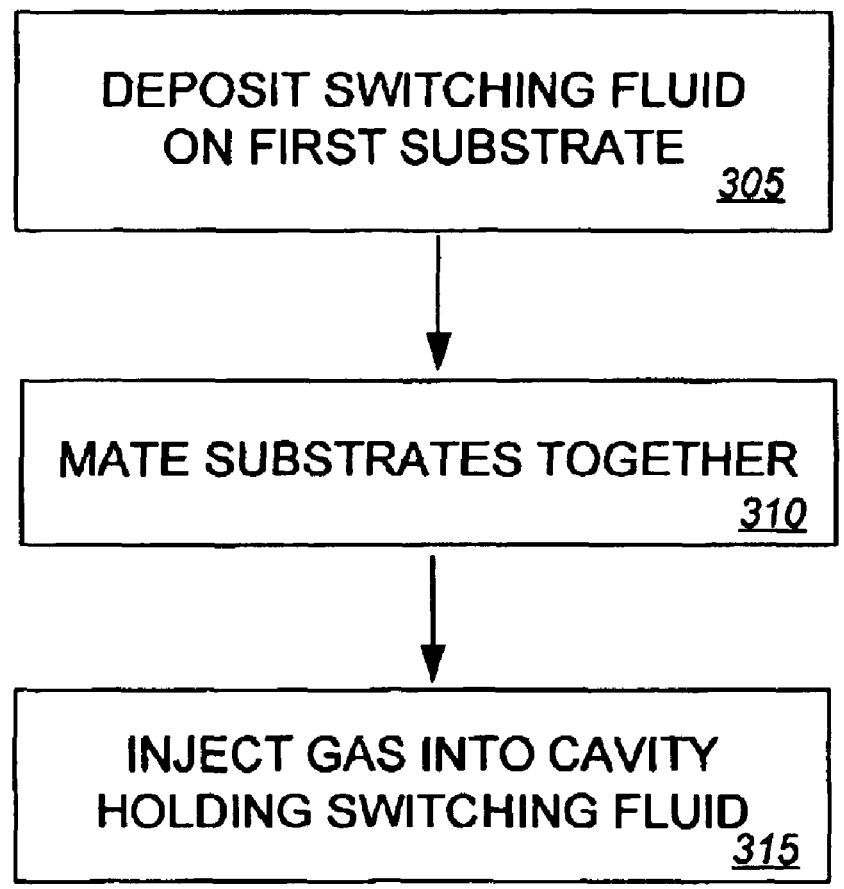
FIG. 3 illustrates an exemplary method that may be used to produce the fluid-bases switch of FIGS. 1 and 2.

As illustrated by FIG. 3, the switch 100 may be produced by depositing 305 a switching fluid 118 on a plurality of contacts 112–116 on a first substrate 103. In one embodiment, the switching fluid may be a liquid metal, such as mercury or alloys that contain gallium. As will be described in further detail below, the switching fluid 118 may be used to make and break contact between the contacts 112, 114, 116. In an alternate embodiment, the switching fluid may be deposited on a plurality of wettable pads and may be used to open and block light paths. Although the switch illustrated in FIG. 1 includes three contacts, it should be appreciated that alternate embodiments may have a different number of contacts.

Next, the first substrate 103 is mated 310 to a second substrate 101 so that a cavity holding the switching fluid 118 is defined between the two substrates. The cavity is sized to allow movement of the switching fluid 118 between first and second states. Gas 122 is then injected 315 into the cavity holding the switching fluid. The injection may be done during the process of mating the substrates or after mating the substrates. The gas may be used to help reduce or prevent oxides from forming on the switching fluid. By way of example, when mercury is used as the switching fluid, the gas 122 may be carbon monoxide or hydrogen. The gas 122 may react with free oxygen in the switch and any oxides of mercury that may have formed in the switch. The reaction may be started using any suitable method to initiate the reaction, such as high temperature or the use of one or more catalysts.

Figure 4:
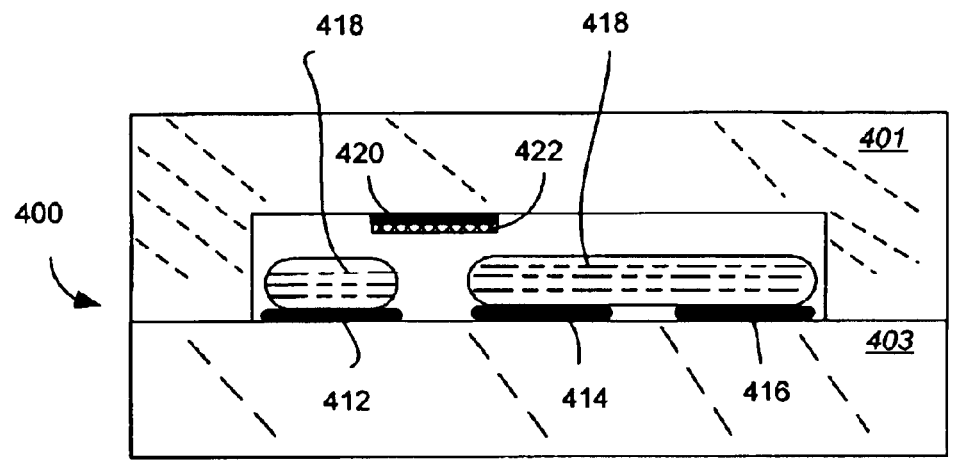
FIG. 4 illustrates an elevation of a second exemplary embodiment of a fluid-based switch.
Figure 5:
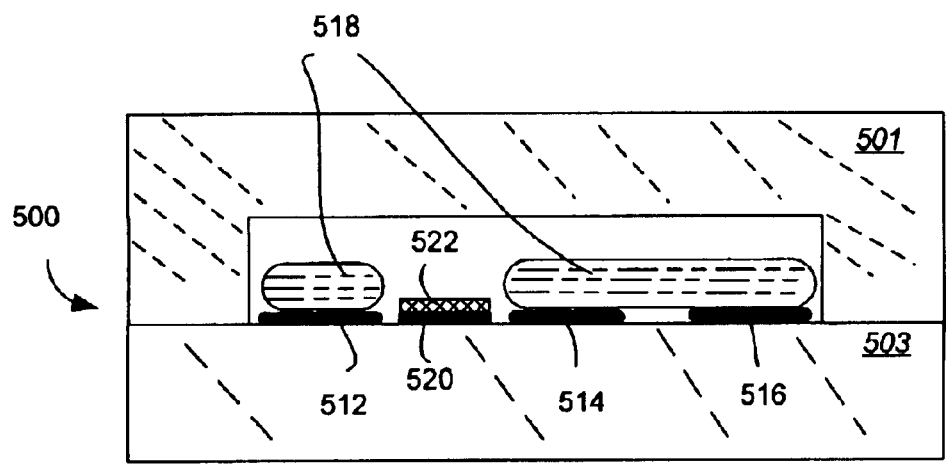
FIG. 5 illustrates an elevation of a third exemplary embodiment of a fluid-based switch.
Figure 6:
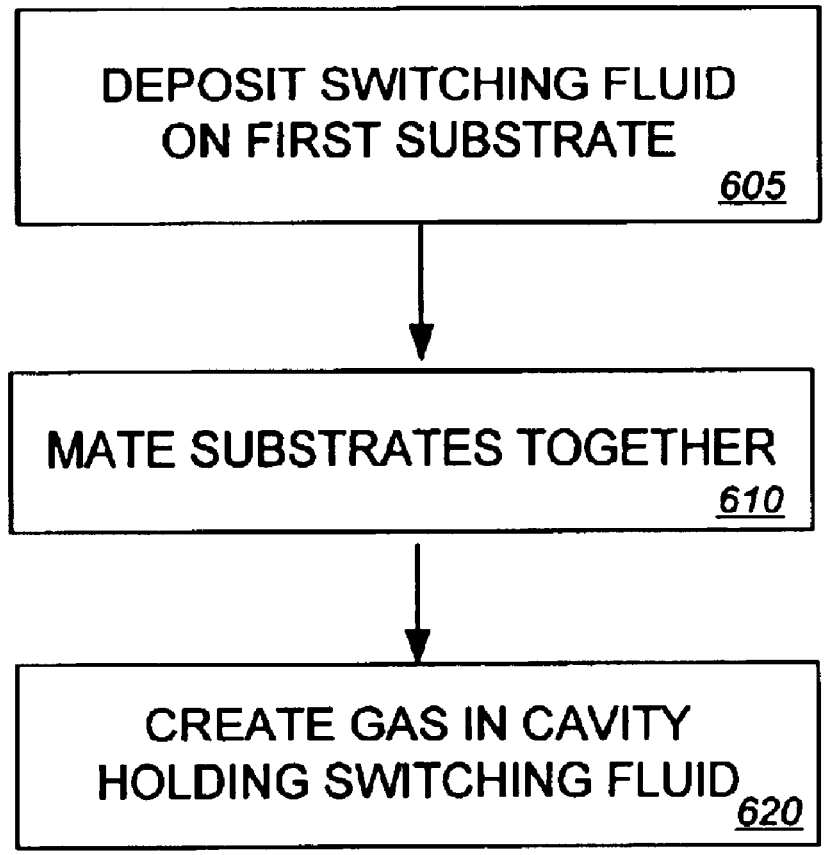
FIG. 6 illustrates an exemplary method that may be used to produce the fluid-based switch of either FIG. 4 or FIG. 5.

An alternative method that may be used to reduce oxides on a switching fluid will now be described with reference to FIGS. 4, 5, and 6. FIG. 4 illustrates a switch 400 including a plurality of contacts 412, 414, 416 on a first substrate 402. A switching fluid 418 is deposited 605 on the contacts. The switching fluid 418 (e.g., mercury) may be used to make and break contact between the contacts. In an alternate embodiment, switching fluid 418 may be deposited on a plurality of wettable pads and may be used to open and block light paths.

The first substrate 403 is mated 610 to a second substrate 401 so that a cavity holding the switching fluid is defined between the two substrates 401, 403. The cavity is sized to allow movement of the switching fluid 418 between first and second states Next, gas is created 615 in the cavity holding the switching fluid 418. The gas may be created by depositing a catalyst 420 on one of the substrates. By way of example, the catalyst may be platinum or palladium. Other suitable catalysts are also contemplated.

Carbon 422 is deposited on the catalyst 420. The carbon may be deposited as a thin layer. Carbon monoxide may be generated within the cavity by exciting the catalyst 420 to create 615 the gas. The catalyst may be excited by heating the catalyst to react the carbon with residual oxygen. Alternately, light may also be used to initiate or increase the reaction rate if the switch is sufficiently transparent. The gas created may be used to help reduce or prevent oxides from forming on the switching fluid 418. Although FIG. 4 illustrates the catalyst 420 deposited in the cavity holding the switching fluid, in alternate embodiments it may be deposited in other locations in the switch that will allow the gas created to reach the switching fluid 418.

An alternate method that may be used to create 615 the gas will now be described with reference to FIG. 5. A switch 500 includes a plurality of contacts 512, 514, 516 on a first substrate 503. A switching fluid 518, such as liquid mercury is deposited on the contacts. The switching fluid may be used to make and break contact between the contacts. In alternate embodiments, the switching fluid may be deposited on a plurality of wettable pads and may be used to open and block light paths.

The switch 500 further includes a second substrate 501 mated to the first substrate 503 so that a cavity holding the switching fluid is defined between the substrates. A heater 520 (e.g., a thick or thin-film resistance heater) is deposited on one of the substrates. It should be appreciated that the heater 520 may be deposited in any location that will allow the gas created by the heater to reach the switching fluid 518.

Carbon 522 is deposited on the heater 520. Alternately, as will be described in further detail below, the carbon 522 may be deposited on a heater used to heat actuating fluid. Carbon monoxide may be generated within the cavity by activating the heater causing the carbon to react with residual oxygen. Alternately, light may be used to initiate or increase the reaction rate. The gas created may be used to help reduce or prevent oxides from forming on the switching fluid 518.

Figure 7:
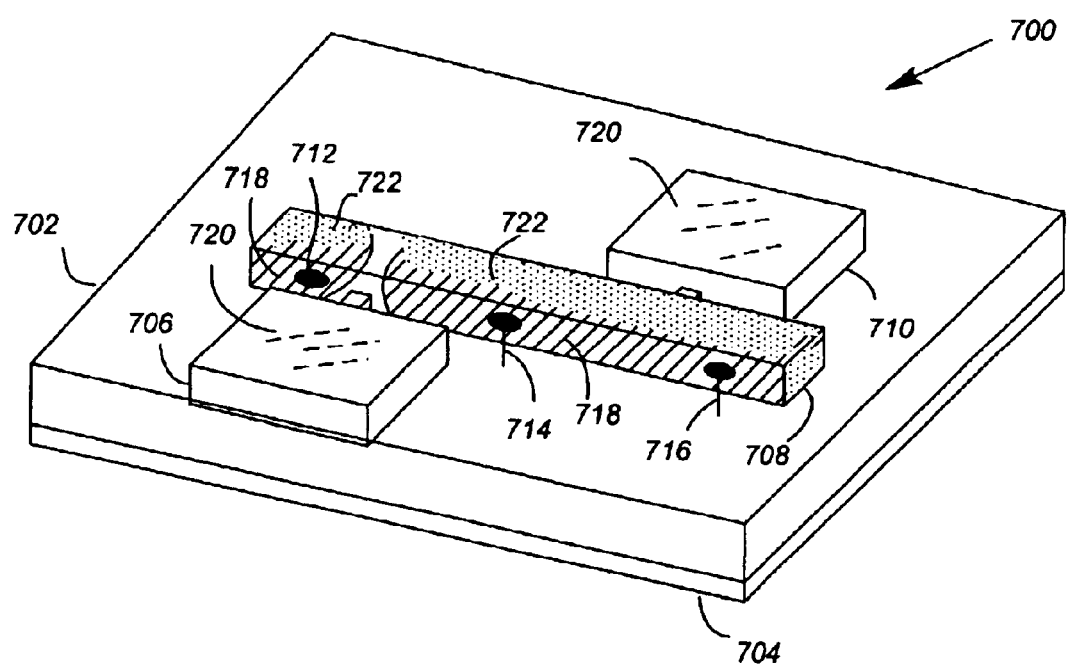
FIG. 7 illustrates a perspective view of an exemplary embodiment of a switch including a gas to react with oxygen or oxides in the switch's switching fluid channel.

The functioning of a switch according to one embodiment can be explained with reference to FIG. 7. The switch 700 comprises a first substrate 702 and a second substrate 704 mated together. The substrates 702 and 704 define between them a number of cavities 706, 708, and 710. Exposed within one or more of the cavities are a plurality of electrodes 712, 714, 716. A switching fluid 718 (e.g., a conductive liquid metal such as mercury) held within one or more of the cavities serves to open and close at least a pair of the plurality of electrodes 712–716 in response to forces that are applied to the switching fluid 718. An actuating fluid 720 (e.g., an inert gas or liquid) held within one or more of the cavities serves to apply the forces to the switching fluid 718.

In one embodiment of the switch 700, the forces applied to the switching fluid 718 result from pressure changes in the actuating fluid 720. The pressure changes in the actuating fluid 720 impart pressure changes to the switching fluid 718, and thereby cause the switching fluid 718 to change form, move, part, etc. In FIG. 7, the pressure of the actuating fluid 720 held in cavity 706 applies a force to part the switching fluid 718 as illustrated. In this state, the rightmost pair of electrodes 714, 716 of the switch 700 are coupled to one another. If the pressure of the actuating fluid 720 held in cavity 706 is relieved, and the pressure of the actuating fluid 720 held in cavity 710 is increased, the switching fluid 718 can be forced to part and merge so that electrodes 714 and 716 are decoupled and electrodes 712 and 714 are coupled.

By way of example, pressure changes in the actuating fluid 720 may be achieved by means of heating the actuating fluid 720, or by means of piezoelectric pumping. The former is described in U.S. Pat. No. 6,323,447 of Kondoh et al. entitled "Electrical Contact Breaker Switch, Integrated Electrical Contact Breaker Switch, and Electrical Contact Switching Method", which is hereby incorporated by reference for all that it discloses. The latter is described in U.S. patent application Ser. No. 10/137,691 of Marvin Glenn Wong filed May 2, 2002 and entitled "A Piezoelectrically Actuated Liquid Metal Switch", which is also incorporated by reference for all that it discloses. Although the above referenced patent and patent application disclose the movement of a switching fluid by means of dual push/pull actuating fluid cavities, a single push/pull actuating fluid cavity might suffice if significant enough push/pull pressure changes could be imparted to a switching fluid from such a cavity. Additional details concerning the construction and operation of a switch such as that which is illustrated in FIG. 7 may be found in the afore-mentioned patent of Kondoh.

Switch 700 further includes gas 722 (e.g., carbon monoxide or hydrogen) held within the cavity 608 containing switching fluid 718. In one embodiment, gas 722 may be used to react with oxygen in the cavity 708. Gas 722 may also be used to react with oxides that may form on switching fluid 718. High temperature or one or more catalysts may be used to initiate a reaction. Other methods may also be used to start the reaction between gas 722 and oxygen.

In one embodiment, a mechanism similar to that described with reference to FIG. 4 may be used to create the gas 722. Alternatively, a mechanism similar to that described with reference to FIG. 5 may be used. Other suitable mechanisms may also be used. For example, carbon 522 may be deposited on a heater used to heat the actuating fluid 720.

A second exemplary embodiment of the functioning of a switch 800 will now be described with reference to FIG. 8. The switch 800 comprises a substrate 802 and a second substrate 804 mated together. The substrates 802 and 804 define between them a number of cavities 806, 808, 810. Exposed within one or more of the cavities are a plurality of wettable pads 812–816. A switching fluid 818 (e.g., a liquid metal such as mercury) is wettable to the pads 812–816 and is held within one or more of the cavities. The switching fluid 818 serves to open and block light paths 822/824, 826/828 through one or more of the cavities, in response to forces that are applied to the switching fluid 818. By way of example, the light paths may be defined by waveguides 822–828 that are aligned with translucent windows in the cavity 808 holding the switching fluid. Blocking of the light paths 822/824, 826/828 may be achieved by virtue of the switching fluid 818 being opaque. An actuating fluid 820 (e.g., an inert gas or liquid) held within one or more of the cavities serves to apply the forces to the switching fluid 818.

Switch 800 additionally includes gas 830 (e.g., carbon monoxide or hydrogen) held within the cavity 808 containing switching fluid 818. Gas 830 may be used to react with oxygen in the cavity 808. Gas 830 may also be used to react with oxides that may form on switching fluid 818. High temperature, one or more catalysts, or another method may be used to initiate a reaction. The gas 830 may be created with a mechanism similar to that described with reference to FIG. 4 or the mechanism described with reference to FIG. 5. Alternately, carbon 522 may be deposited on a heater used to heat the actuating fluid 820. Other suitable mechanisms may also be used.

Figure 8:
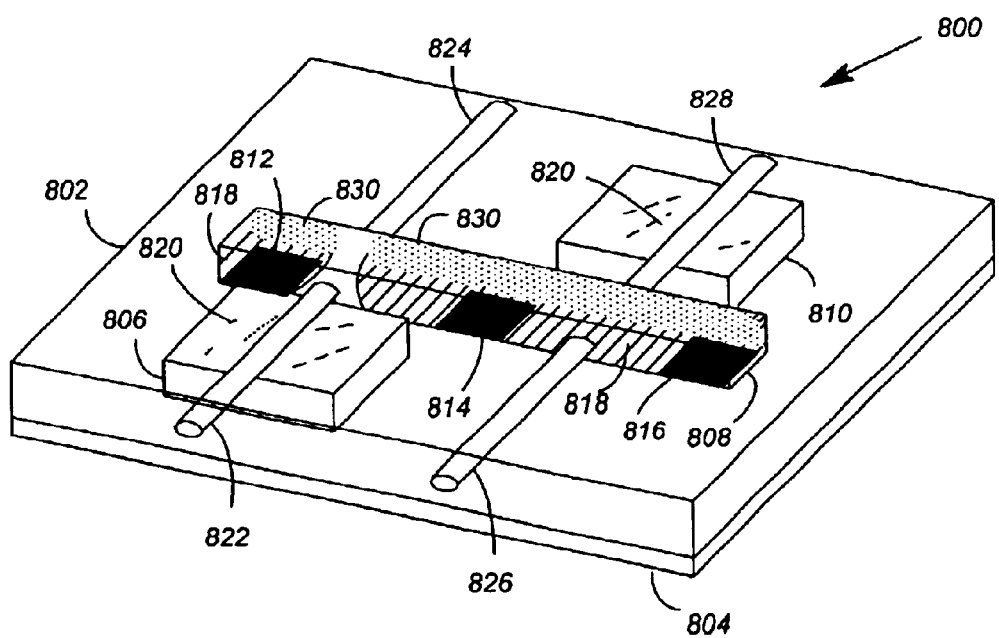
FIG. 8 illustrates a perspective view of another exemplary embodiment of a switch including a gas to react with oxygen or oxides in the switch's switching fluid channel.

Additional details concerning the construction and operation of a switch such as that which is illustrated in FIG. 8 may be found in the aforementioned patent of Kondoh et al., and patent application of Marvin Wong.

While illustrative and presently preferred embodiments of the invention have been described in detail herein, it is to be understood that the inventive concepts may be otherwise variously embodied and employed. The appended claims are intended to be construed to include such variations, except as limited by the prior art.

What is claimed is:

1. A method, comprising:

depositing a switching fluid on a first substrate;

mating the first substrate to a second substrate, the first substrate and the second substrate defining therebetween a cavity holding the switching fluid, the cavity being sized to allow movement of the switching fluid between first and second states; and creating a gas in the cavity holding the switching fluid, the gas to react with at least one of oxygen in the cavity and oxides on the switching fluid.

2. The method of claim 1, further comprising:

before mating the substrates, depositing a catalyst on one of the substrates;

depositing a carbon layer on the catalyst; and after mating the substrates, exciting the catalyst to create the gas.

3. The method of claim 2, wherein exciting the catalyst comprises heating the catalyst.

4. The method of claim 2, wherein creating a gas comprises applying light to the catalyst.

5. The method of claim 2, wherein the catalyst comprises at least one of a platinum and a palladium catalyst.

6. The method of claim 1, further comprising:

before mating the substrates, depositing a resistance heater on one of the substrates;

depositing a carbon layer on the resistance heater; and after mating the substrates, activating the heater.

7. The switch of claim 1, wherein the gas comprises carbon monoxide.

8. The switch of claim 1, wherein the switching fluid comprises mercury.

9. The switch of claim 1, wherein the switching fluid comprises a gallium alloy.

10. A switch comprising:

first and second mated substrates defining therebetween at least portions of a number of cavities;

a plurality of electrodes exposed within one or more of the cavities;

a switching fluid, held within a first one of the cavities, that serves to open and close at least a pair of the plurality of electrodes in response to forces that are applied to the switching fluid;

a gas held within the first cavity, the gas to react with at least one of oxygen in the cavity and oxides on the switching fluid;

an actuating fluid, held within one or more of the cavities, that applies the forces to said switching fluid.

11. The switch of claim 10, further comprising a mechanism, presenting within one or more of the cavities, to create the gas.

12. The switch of claim 11, wherein the mechanism comprises:

a catalyst deposited on one of the substrates; and carbon deposited on the catalyst.

13. The switch of claim 12, wherein the catalyst comprises at least one of a platinum and a palladium catalyst.

14. The switch of claim 11, wherein the mechanism comprises:

a heater attached to one of the substrates; and carbon deposited on the heater.

15. The switch of claim 10, wherein the gas comprises carbon monoxide.

16. The switch of claim 10, wherein the gas comprises hydrogen.

17. A switch comprising:

first and second mated substrates defining therebetween at least portions of a number of cavities;

a plurality of wettable pads exposed within one or more of the cavities;

a switching fluid, wettable to said pads and held within one or more of the cavities, that serves to open and block light paths through one or more of the cavities in response to forces that are applied to the switching fluid;

a gas held within the first cavity, the gas to react with at least one of oxygen in the cavity and oxides on the switching fluid; and an actuating fluid, held within one or more of the cavities, that applies the forces to said switching fluid.

18. The switch of claim 17, further comprising a mechanism, presenting within one or more of the cavities, to create the gas.

19. The switch of claim 18, wherein the mechanism comprises:

a catalyst deposited on one of the substrates; and carbon deposited on the catalyst.

20. The switch of claim 19, wherein the catalyst comprises at least one of a platinum and a palladium catalyst.

21. The switch of claim 18, wherein the mechanism comprises:

a heater attached to one of the substrates; and carbon layer deposited on the resistance heater.

22. The switch of claim 17 wherein the gas comprises carbon monoxide.

23. The switch of claim 17, wherein the gas comprises hydrogen.

24. A method, comprising:

depositing a switching fluid on a first substrate;

mating the first substrate to a second substrate, the first substrate and the second substrate defining therebetween a cavity holding the switching fluid, the cavity being sized to allow movement of the switching fluid between first and second states; and injecting a gas into the cavity, the gas to react with at least one of oxygen in the cavity and oxides on the switching fluid.

25. The method of claim 24, wherein the gas comprises carbon monoxide.

26. The method of claim 24, wherein the gas comprises hydrogen.

27. The method of claim 24, wherein the switching fluid comprises mercury.

28. The method of claim 24, wherein the switching fluid comprises a gallium alloy.

29. The method of claim 24, wherein the gas is injected during mating the substrates.

30. The method of claim 24, wherein the gas is injected after mating the substrates.

* * * * *